United States Patent
Kelly

(10) Patent No.: US 11,016,368 B2
(45) Date of Patent: May 25, 2021

(54) TRIPOD COVER

(71) Applicant: Aaron James Kelly, University Place, WA (US)

(72) Inventor: Aaron James Kelly, University Place, WA (US)

(*) Notice: Subject to any disclaimer, the term of this patent is extended or adjusted under 35 U.S.C. 154(b) by 11 days.

(21) Appl. No.: 15/998,237

(22) Filed: Mar. 1, 2017

(65) Prior Publication Data

US 2019/0235359 A1 Aug. 1, 2019

(51) Int. Cl.
*G03B 17/56* (2021.01)

(52) U.S. Cl.
CPC ............ *G03B 17/56* (2013.01); *G03B 17/561* (2013.01)

(58) Field of Classification Search
CPC .... G03B 17/561; G03B 17/56; A47G 11/003; E04G 2021/248
See application file for complete search history.

(56) References Cited

U.S. PATENT DOCUMENTS

| | | | | |
|---|---|---|---|---|
| 4,581,277 A | * | 4/1986 | Neale | A47G 33/045 2/211 |
| 6,742,792 B1 | * | 6/2004 | Hooper | B62B 3/002 150/154 |
| 2001/0050097 A1 | * | 12/2001 | Fazel | A45B 25/24 135/15.1 |

OTHER PUBLICATIONS

BOG-POD BOGgear TIPI Tripod/Bipod Cover; Amazon.com product website; https://www.amazon.com/BOG-POD-BOGgear-Tripod-Bipod-Cover/dp/B004XV1WCW/ref=sr_1_1?dchild=1&keywords=bog-pod+boggear+tipi+tripod&qid=1607974307&sr=8-1; accessed Dec. 10, 2020; published Apr. 25, 2011. (Year: 2011).*
LensCoat Photo Blind Lens Hide; Amazon.com product website; https://www.amazon.com/LensCoat-Weight-Realtree-camera-LCLH2TM4/dp/B01M5BCYQE/ref=sr_1_40?dchild=1&keywords=lenscoat&qid=1607974653&sr=8-40; accessed Dec. 14, 2020; published Sep. 1, 2016. (Year: 2016).*
Pyle Universal Lighting Tripod Stand Scrim; Amazon.com product website: https://www.amazon.com/Pyle-PSCRIMW2-Universal-Compatibility-Mountable/dp/B00TJ2FDTI/ref=sr_1_1?dchild=1&keywords=pyle+universal+lighting+tripod&qid=1607974818&sr=8-1; accessed Dec. 10, 2020; published Feb. 12, 2015. (Year: 2015).*
DJ Skirts Tripod Skirt; Youtube.com video; progrearwarehouse; https://www.youtube.com/watch?v=5tSINg4vRu8; accessed Dec. 10, 2020; published Jan. 28, 2008. (Year: 2008).*
The Tripod Skirt; Youtube.com video; Joshua Kelly Productions; https://www.youtube.com/watch?v=dowHpXjhtm8; accessed on Dec. 10, 2020; published May 18, 2016. (Year: 2016).*
Movo CRC03 Extra-Long Waterproof Rain Coat for DSLR Camera; Amazon.ca product website; https://www.amazon.ca/Movo-Extra-Long-Waterproof-Camera-Metallic/dp/B01LMZP5X8/ref=sr_1_5?dchild=1&keywords=movo+crc03&qid=1607975226&sr=8-5; accessed Dec. 11, 2020; published Nov. 19, 2016. (Year: 2016).*
Telegizmos TGTP Tripod Cover; skiesunlimited.com website; accessed Dec. 11, 2020; published Jun. 29, 2015. (Year: 2015).*

* cited by examiner

*Primary Examiner* — Daniel J Colilla

(57) ABSTRACT

The Tripod Cover is made of fabric with the purpose of covering a tripod. Tripods are often a hot spot in video production causing a dilemma for producers. When the tripod is covered distractions to the video production like tripods and cords are no longer seen, and the whole camera unit blends in with its environment.

1 Claim, 5 Drawing Sheets

TRIPOD COVER

CROSS REFERENCES

There is no Cross References to related applications, as this is the first application to be filed.

FEDERALLY SPONSORED RESEARCH

There has been no federally sponsored research or development done on this invention.

REFERENCE TO A "SEQUENCE LISTING"

There are no materials submitted with this application on any compact discs.

BACKGROUND OF THE INVENTION

This invention came about when the inventor spent years in the film and video production industry. Continually, tripods were being exposed to the client and audience leaving a professional production not looking so professional. He observed that if the tripod and other distractions that were necessary for the production were covered and not exposed, this part of the production would not be a distraction from what they were there filming. He wanted the client to see how a professional video production could blend in with the venture and not have their presence felt. The inventor thought the Tripod Cover was a simple and practical solution for a need.

This invention can be easily placed on any tripod with an adjustable cord like string that can be tightly tied at the neck of the tripod. There is Velcro that can be used to close the slit on the back of the cover if they wish to close it. There are also three hook and ladder straps on each side of the back opening of the tripod cover that can be used to secure the tripod cover to any part of the tripod.

BRIEF SUMMARY OF THE INVENTION

The Tripod Cover is intended to be placed on the tripod to cover the tripod, cords, cables, bags and any other unwanted things that would normally be exposed during a video production.

BRIEF DESCRIPTION OF THE DRAWINGS

Five drawings of the Tripod Cover have been included in the application.

DETAILED DESCRIPTION OF INVENTION

Figure 1:
FIG. 1 is the view from the front side of the invention. It highlights the view that would be seen by most people. A sleek look eliminating required distractions of a video production like cords, and tripods.
Figure 2:
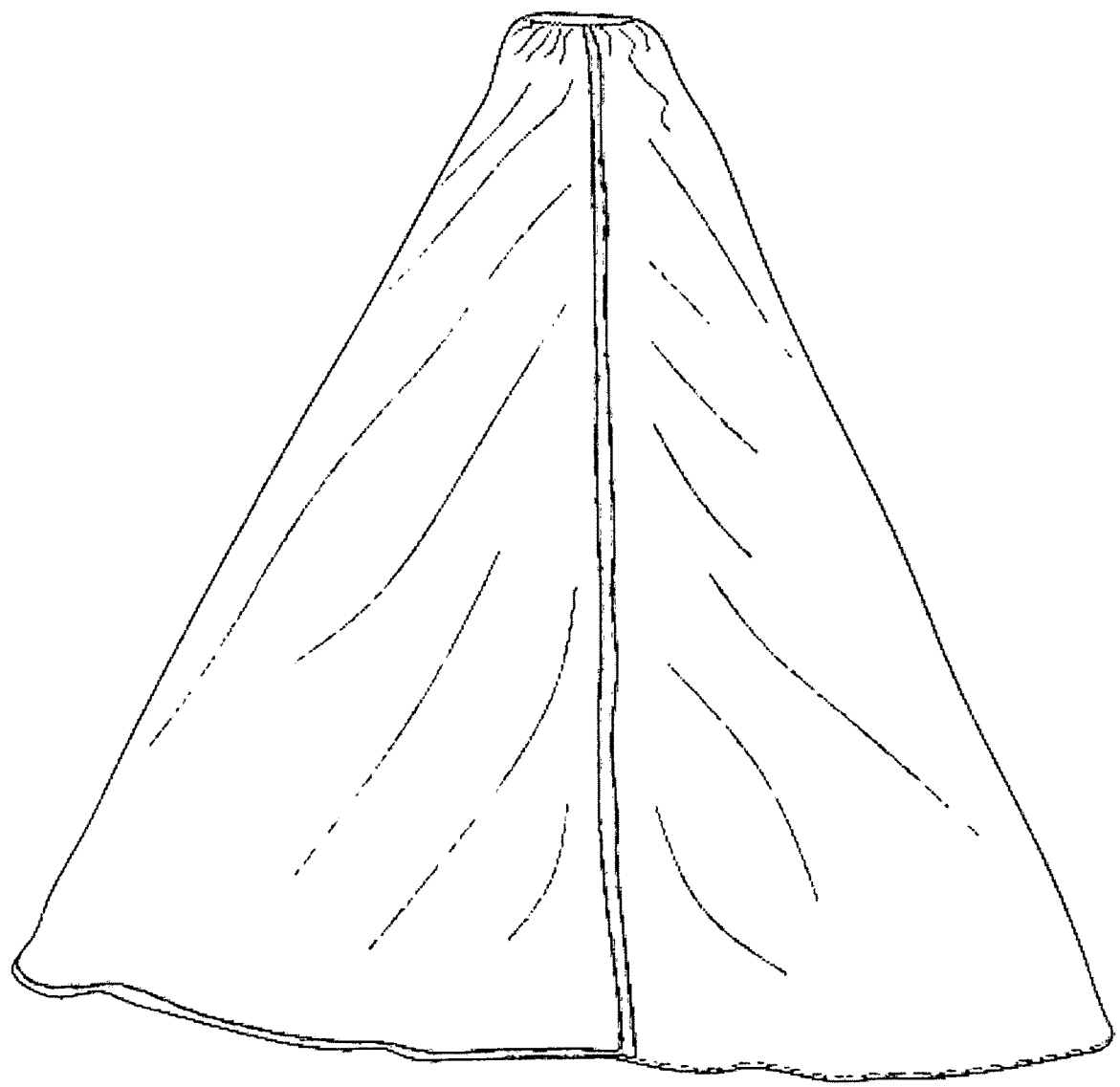
FIG. 2 is the view from the back side of the invention when it is closed using the Velcro. This view shows how the cover can be enclosed around the tripod. This is where the camera operator would stand.
Figure 3:
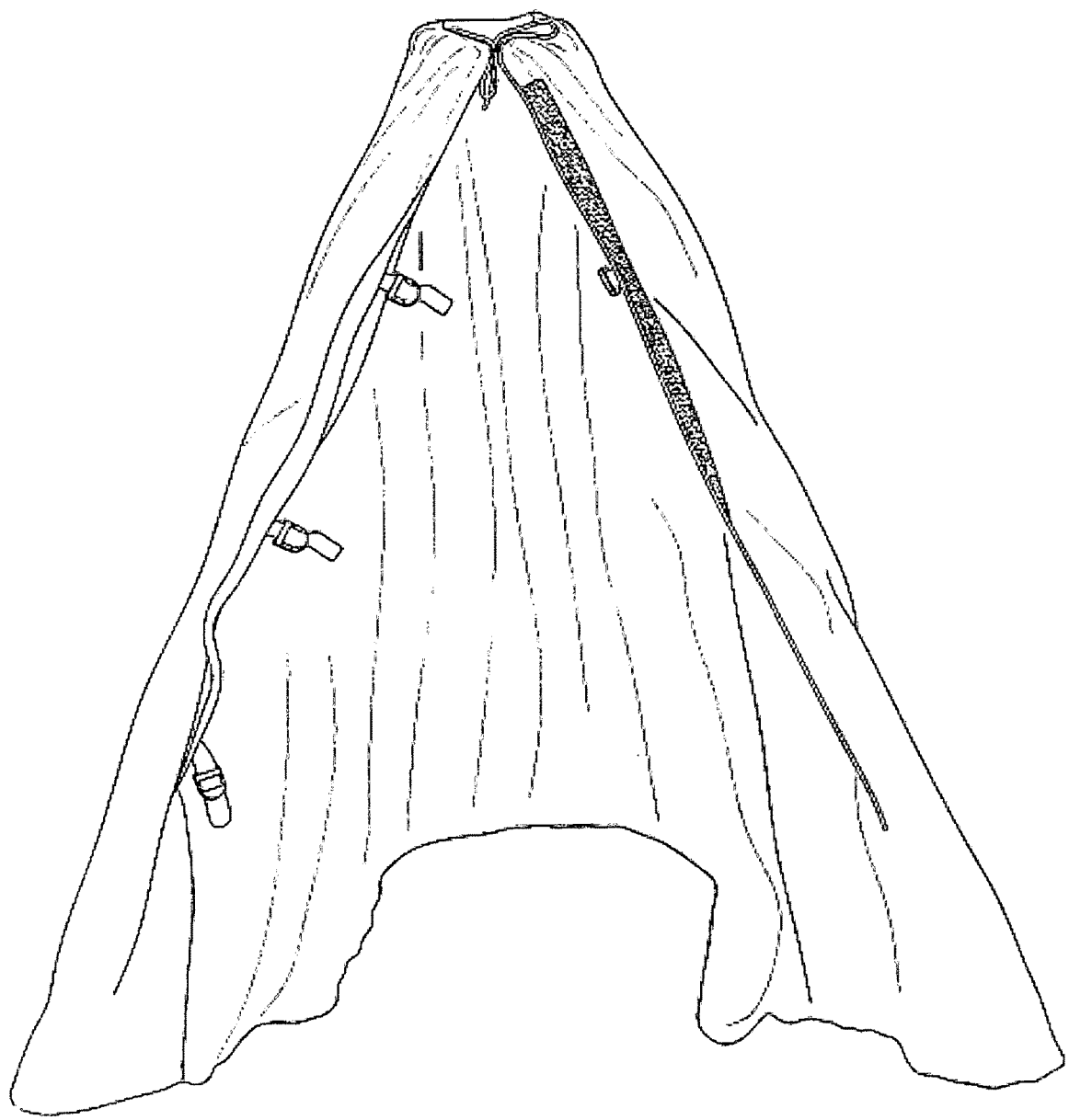
FIG. 3 is the view from the back side of the invention when it is open and secured to the tripod using the straps. It shows the accessibility under the Tripod Cover through the back while the front still remains covered and maintains the sleek look. The back could remain open or closed during production, because it doesn't change how it looks in the front. This option is great, especially for camera operators.
Figure 4:
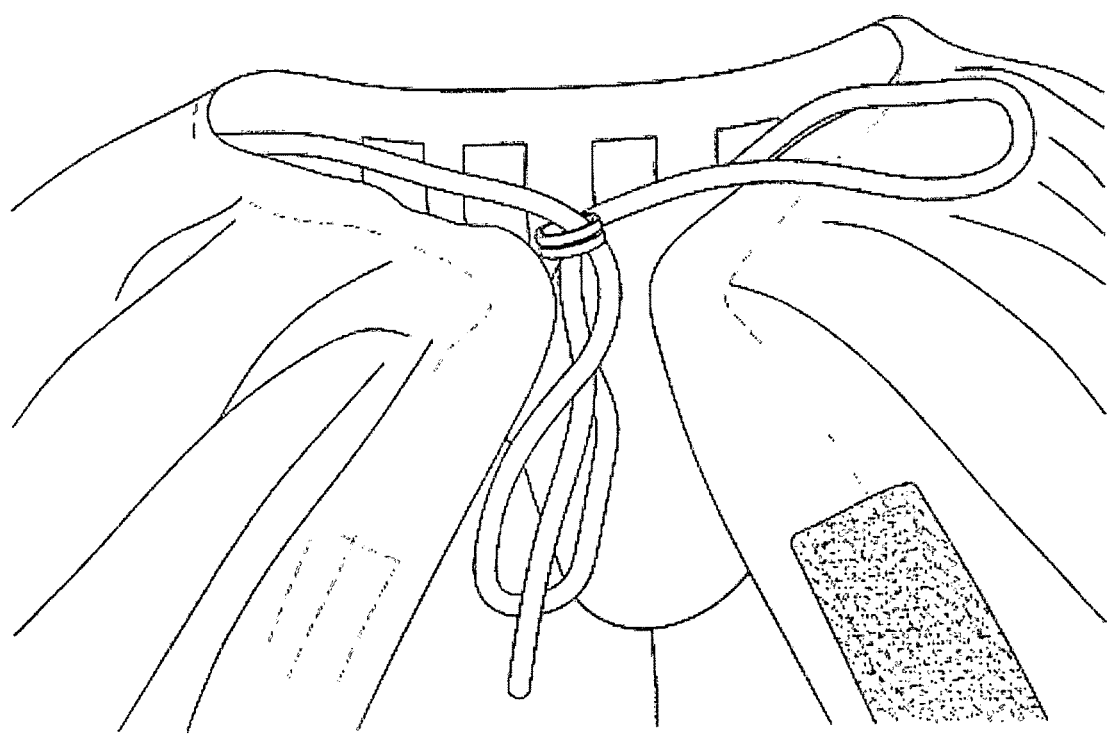
FIG. 4 is the view of the cinch strap that is used to secure the Tripod Cover to the tripod. The versatility of the circle design allows for the covering to fit on various heads of tripods.
Figure 5:
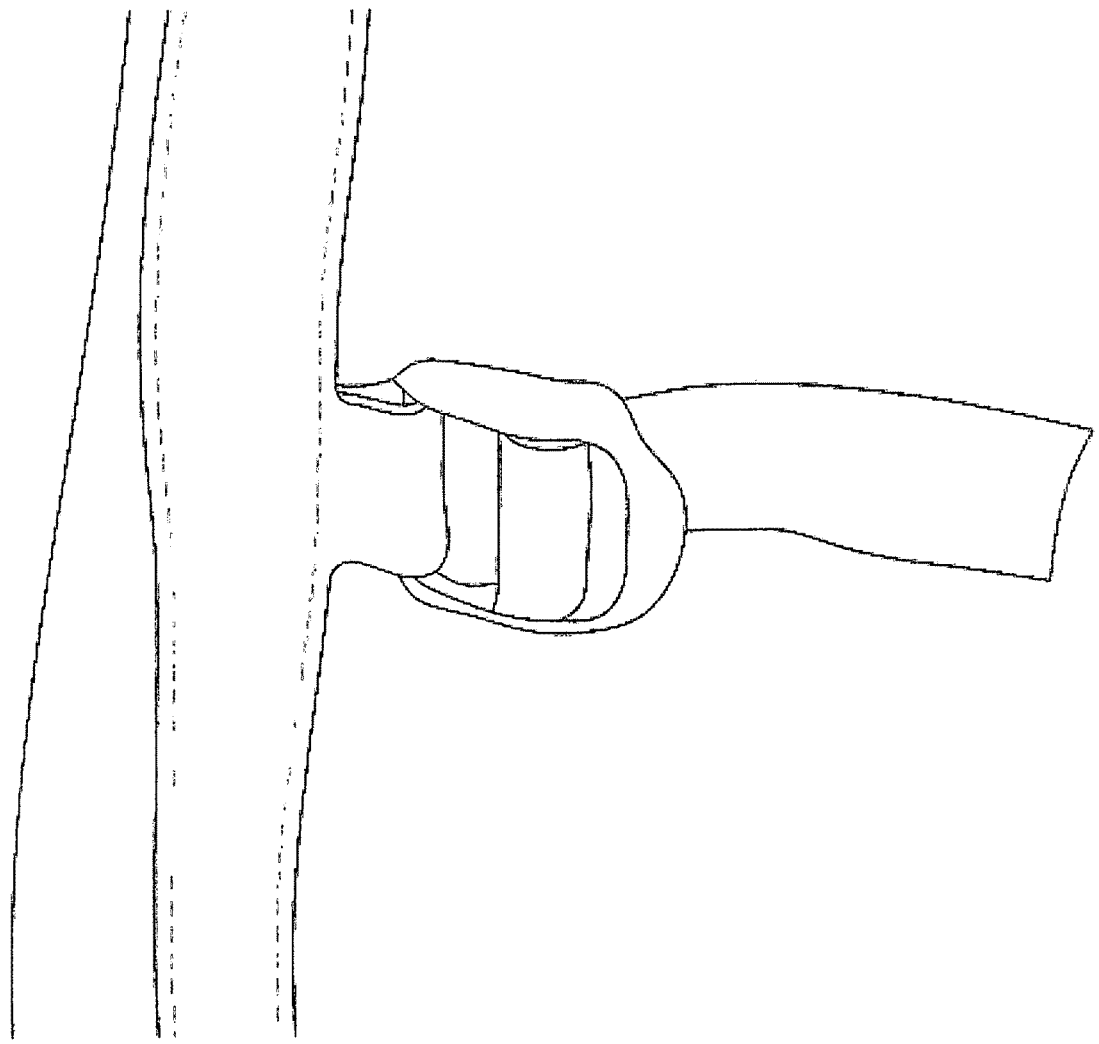
FIG. 5 is the view of the hook and ladder strap with webbing and Velcro. There are three of these straps secured on the inside of the Tripod Cover on each side of the slit that runs down the full length on the back. These straps are used to secure the Tripod Covering onto the tripod if they want to keep the back portion open. The Velcro provides the option of keeping the back closed.

A Tripod Skirt is the premier, fully adjustable Tripod scrim. Industry pros know that unsightly cords are a problem, but a necessary evil. We have created a sleek solution by developing a way to cover up your unsightly cords and creating a professional look in any situation or event.

Adjustable features make this cover useful for most tripods, and in various situations. Simply tie a Tripod Skirt's cinch cord below the head of your tripod, to form a secure fit on tripods of all sizes. The opening on the back is equipped with heavy duty hook and loop closures, which allows for cords to be placed through at the position of your choosing. And three quality straps are attached down the opening on each side of a Tripod Cover, to allow for a solid securing to the tripod legs, creating a back open position if desired.

A Tripod Cover is in the shape of a circle allowing it to fit various tripods. The diameter of a Tripod Cover is 115 inches with a smaller 6 inch diameter circle cut out in the center of the larger circle. The radius from the edge of the smaller center circle to the outer edge of a Tripod Cover is 54 inches. From the smaller center circle there is a slit on the back, the full length of a Tripod Cover to the edge of the larger circle. This allows an opening on the back for accessibility under a Tripod Cover and to fit on most tripods. Each side of the slit has 36 inches of hook and loop closures allowing for a Tripod Cover to be tightly closed. There are three secure hook and ladder straps with webbing on each side of the full length slit. There is one strap and webbing 12 inches from the center circle and the next two evenly spaced 12 inches apart. The straps are 1 inch in width and webbing is 11.5 inches. There is a 36 inch cinch cord that runs through the material around the circumference of the smaller center circle used to secure a Tripod Cover on the head of a tripod.

Clients love a Tripod Skirt because of the sleek professional look, and operators love it because it solves another industry problem of where to store personal belongings. Simply place your belongings in the included carrying bag, hang it from the center of the tripod, and you now have a hidden spot within reach to store your personal belongings.

The invention claimed is:
1. A tripod covering comprising:
   a round piece of fabric with a circle hole in the center;
   a string weaved around the circle hole for securing the fabric on a tripod;
   a slit in the fabric from an outer edge to the center circle hole configured to allow for the covering to be place over the tripod;
   a continuous strip of hook and loop closure sewed along the slit; and three hook and ladder clasps on each side of the slit, wherein each hook and ladder clasp is configured to secure the fabric to a leg of the tripod thereby allowing an open space on the tripod that is not covered by the fabric.

* * * * *